United States Patent [19]

Woodley

[11] Patent Number: 4,602,748

[45] Date of Patent: Jul. 29, 1986

[54] AUTOMATIC CASSETTE LOADING MACHINE WITH A RECIPROCATING TAKEUP SPINDLE

[75] Inventor: George M. Woodley, Shrewsbury, Mass.

[73] Assignee: King Instrument Corporation, Westboro, Mass.

[21] Appl. No.: 653,292

[22] Filed: Sep. 24, 1984

[51] Int. Cl.$^4$ ...................... B65H 18/10; B65H 19/26
[52] U.S. Cl. .................................. 242/56 R; 242/68.3
[58] Field of Search .............. 242/56 R, 67.3 R, 68.3, 242/199, 200

[56] References Cited

U.S. PATENT DOCUMENTS

| | | | |
|---|---|---|---|
| 3,637,154 | 1/1972 | Northrup | 242/56 R |
| 3,712,553 | 1/1973 | Napor et al. | 242/56 R |
| 3,997,123 | 12/1976 | King | 242/56 R |

*Primary Examiner*—John M. Jillions
*Attorney, Agent, or Firm*—Schiller & Pandiscio

[57] ABSTRACT

A novel winding or takeup mechanism is disclosed for use in a machine for automatically loading tape into empty cassettes containing leaders, i.e., C-zero cassettes. The novel winding or takeup mechanism, which provides extended machine life and faster machine operation, comprises an arrangement whereby an electric motor drive operates to rotate a takeup spindle adapted to drivingly engage a hub or spool of an empty cassette in loading position. The spindle is coupled to the output shaft of the takeup motor by a telescoping coupling arrangement whereby the spindle can be reciprocated axially into and out of driving engagement with a hub or spool of a cassette disposed in loading position without interfering with rotation of the spindle by the motor output shaft. A pneumatically operated yoke is employed to accomplish axial reciprocation of the spindle while a separate member transfers the rotational force of the electric motor output shaft to the spindle. The yoke is coupled to the spindle so as not to impede rotation of the spindle.

16 Claims, 5 Drawing Figures

AUTOMATIC CASSETTE LOADING MACHINE WITH A RECIPROCATING TAKEUP SPINDLE

BACKGROUND OF THE INVENTION

This invention relates generally to automatic cassette loading machines for splicing and winding tape and more particularly to such an apparatus having a novel reciprocating spindle arrangement included in the winding mechanism.

Machinery for automatically loading empty cassettes, one at a time, with magnetic tape is well known. An example of this type of machine can be found in U.S. Pat. No. 3,997,123 of James L. King where a magazine is provided for storing a supply of empty cassettes, each of which has a pair of rotatable hubs or spools with leader tape connected therebetween. The magazine feeds cassettes singly to a loading position at which each is held while apparatus withdraws the leader from the cassette and precisely positions it on a splicing block assembly for a severing of the leader into two sections. One leader section is spliced to the leading end of a supply of magnetic tape and then a selected length of the magnetic tape is wound into the cassette by a winding mechanism. A severing mechanism cuts the magnetic tape so as to provide a trailing end of the tape wound into the cassette. This trailing end is spliced to the other leader section of the cassette and then wound into the cassette. Discharge of the loaded cassette from the loading position and feeding another cassette from the magazine to the loading position completes one cycle of the sequential activation of the apparatus automatically to load and discharge cassettes from the machine.

The apparatus described in U.S. Pat. No. 3,997,123 has a pneumatically actuated air turbine fixedly connected to a takeup or wind spindle designed to mate with internal teeth of a cassette spool or hub. The spindle drive, in accordance with said patent, could have an electric motor as a substitute for the air turbine, and, in actual practice all commercially available automatic cassette loading machines now utilize electric motor for driving their takeup spindles. However, the life of an electric motor used to drive a takeup spindle appears to be unacceptably short under actual cassette production line conditions. The useful life of a takeup spindle motor is affected by its constant starting and stopping and the reciprocal movement of the motor required in bringing the takeup spindle into and out of engagement with a cassette in loading position. The competitive nature of the industry indicates that the survival of organizations in the business of making cassette loading machines requires a minimization of down time for repairs and replacement while maintaining a relatively fast cassette loading cycle.

Using a heavier duty takeup motor is not a satisfactory solution since its additional weight necessitates a larger support structure, and greater forces are required to reciprocate the motor toward and away from the cassette loading position. Also, the additional mass of a heavier duty motor may limit the speed with which the motor can be reciprocated. Braking required to overcome the flywheel effect of a heavier motor also becomes more of a problem as is the effect on shaft end play wear caused by the motor reciprocation.

SUMMARY OF THE INVENTION

This invention involves the provision of an electric motor winding mechanism, also known as a take-up system, that incorporates a fixedly mounted electric motor that drives a hollow shaft which, in turn, drives a pneumatically controlled takeup spindle capable of engagement and disengagement with a hub or spool of a cassette disposed in loading position in an automatic cassette loading machine.

A primary object of this invention involves the production of an automatic cassette loading machine with a takeup mechanism having longer life and shorter down time than those currently in use.

A more specific object of this invention involves the provision of a reciprocating take-up or winding mechanism which, when combined with the elements comprising an automatic cassette loading machine, provides for improved machine performance.

Still another object of this invention is addressed by providing a novel drive mechanism for producing a clutching and driving action between a cassette spool or hub and a takeup spindle driven by a high speed, high quality electric takeup motor, with the mechanism being designed so as to increase the useful life of the takeup motor over prior arrangements where the takeup motor is reciprocated.

A further object of this invention includes the provision of a takeup mechanism comprising a takeup spindle and drive motor assembly for an automatic cassette loading machine which is easy and economical to make and can be made of conventional, currently available materials that lend themselves to standard mass production manufacturing techniques.

These and other advantages, features and objects of the invention will become more apparent from the following description taken in connection with the illustrative embodiment in the accompanying drawings.

BRIEF DESCRIPTION OF THE DRAWINGS

In the drawings like numerals denote like parts.

DESCRIPTION OF THE PREFERRED EMBODIMENT

Figure 1:
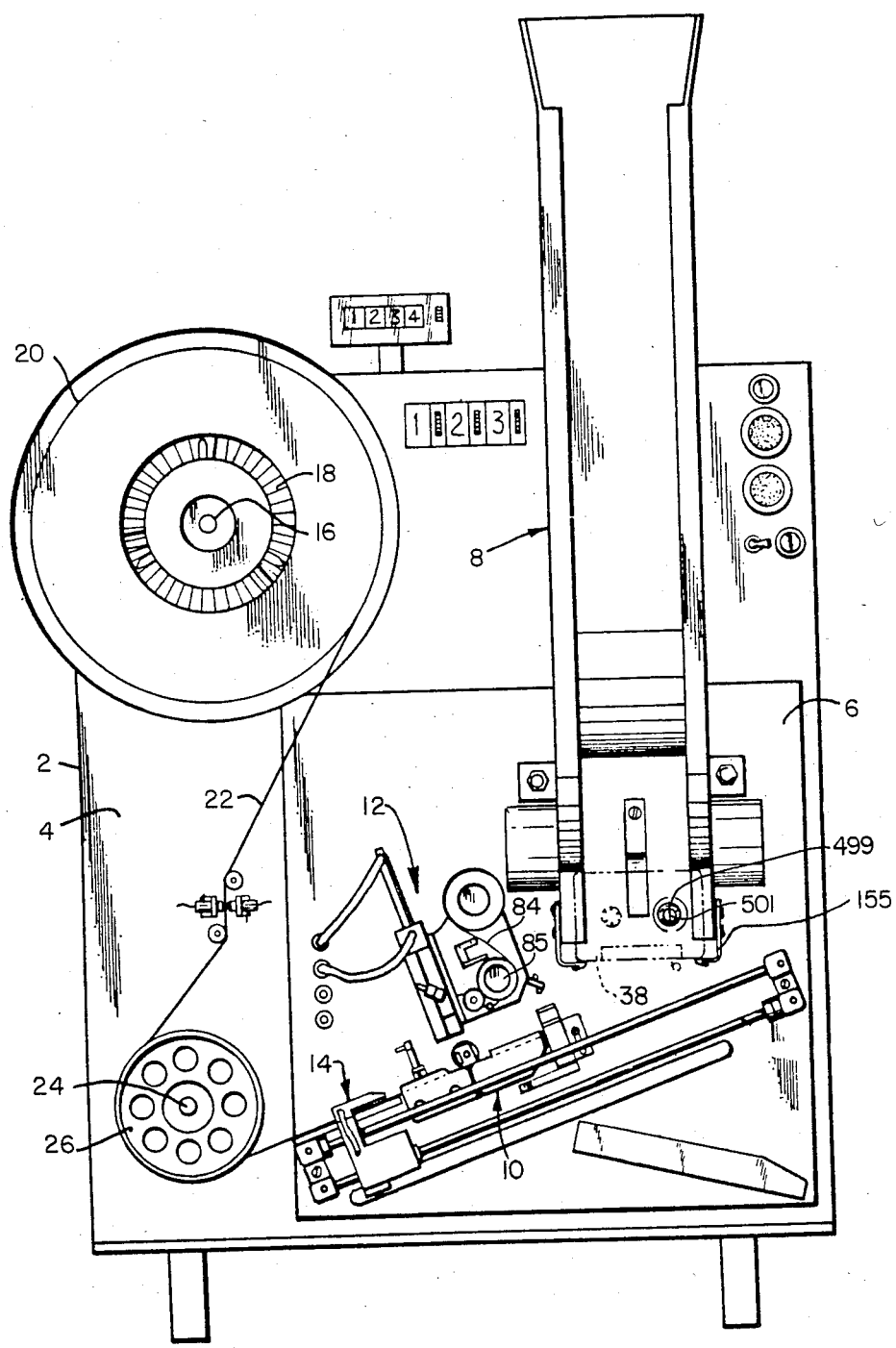
FIG. 1 is a front elevational view of an automatic cassette loading machine which incorporates the novel winding or takeup mechanism of this invention.

Referring now to FIG. 1, there is illustrated an automatic cassette loading machine of the type disclosed in U.S. Pat. No. 3,997,123 of James L. King, issued on Dec. 14, 1976, the disclosure of which is incorporated herein by this reference to the patent. The numerals in FIG. 1, except for item 501, correspond to those utilized in the afore-mentioned patent.

The automatic cassette loading machine of FIG. 1 comprises a housing 2 with a front panel 4 having an opening closed off by a removably secured plate 6 which serves as a support for a blank cassette storage magazine 8. Conventional, blank cassettes (C-zero) are loaded into the magazine 8 which is configured to feed the cassettes singly to a selected loading position at which a blank cassette 38 is illustrated in phantom. Support plate 6 also has mounted thereon a splicing block assembly 10, a splicing tape dispenser applicator 12 and part of a leader extractor mechanism 14. The splicing block assembly 10 and dispenser applicator 12 are mounted at an inclined angle to facilitate operation of the leader extractor mechanism 14. Extending through the front panel 4 are a rotatable tape supply reel shaft 16 to which is affixed a hub assembly 18 for releasably supporting and driving a supply reel 20 of magnetic tape 22, and a rotatable shaft 24 to which is affixed a counting wheel 26. Means (not shown) are provided behind front panel 4 for counting the revolutions of counting wheel 26 and providing an output signal when a predetermined amount of magnetic tape 22 has been wound into cassette 38. Shaft 16 is driven by a drive mechanism (not shown) located behind front panel 4.

A C-zero cassette 38, supplied by magazine 8 is held in the selected loading position by clips 155, in which event the leader extractor mechanism 14 withdraws the leader from the cassette and positions it on the splicing block assembly 10, where the leader is severed into first and second leader sections. The tape 22 to be spliced to the end of the leader is supplied by supply reel 20 on hub assembly 18 which is driven by shaft 16 and guided over counting wheel 26 on shaft 24 to the splicing block assembly 10. Splicing tape dispenser applicator 12 supplies adhesive backed tape 84 from supply reel 85 to the splicing block assembly 10 where tape 84 is cut and applied to splice the one of the two leader sections to the leading end of supply tape 22.

The machine also comprises a novel takeup mechanism 500 (FIGS. 2-5) which is located behind and mounted to plate 6 and comprises a takeup spindle 501 which is designed with a hole 499 (FIG. 1) in plate 6. The takeup mechanism 500 provided by this invention replaces the takeup mechanism disclosed in said U.S. Pat. No. 3,997,123. Takeup mechanism 500 is adapted to move shaft 501 into and out of engagement with a hub or spool of cassette 38 disposed in loading position. When takeup spindle 501 is engaged with a cassette hub and the takeup mechanism is engaged, the takeup spindle will rotatably drive the engaged cassette hole so as to cause the spliced supply tape 22 to be wound into that cassette hub. After a selected length of supply tape has been wound into the cassette, the winding is stopped. Thereafter the supply tape is severed, and then the trailing end of the supply tape is spliced to the other leader section by operation of splicing tape dispenser applicator 12 in the same manner as with the leading end of tape 22. The winding mechanism 500, shown in FIGS. 2 through 5, then is activated to wind the spliced trailing end of supply tape 22 and the other leader section into the cassette. Thereafter spindle 501 is disengaged from the loaded cassette 28 which is then discharged from the loading position to be replaced by another cassette from the magazine 8.

The sequential and cyclical actuation of the mechanisms above-described, as well as more detailed descriptions of the various devices forming the automatic cassette loading machine, can be found in the aforementioned referenced patent. Since the devices, except as noted with respect to the winding or takeup mechanism 500, are substantially the same as those appearing in U.S. Pat. No. 3,997,123, the description presented thus far is detailed only to the extent required to understand and appreciate the combination of devices and their interaction to provide a comprehension of the improvement provided by the instant invention.

The following description of the winding takeup mechanism 500, which obviates the deficiencies of the air turbine drive and the electric motor substitution disclosed by U.S. Pat. No. 3,997,123, is presented to illustrate a cooperation with the other devices forming the combination to produce a viable, economicaly feasible, reliable cassette loading machine.

Figure 4:
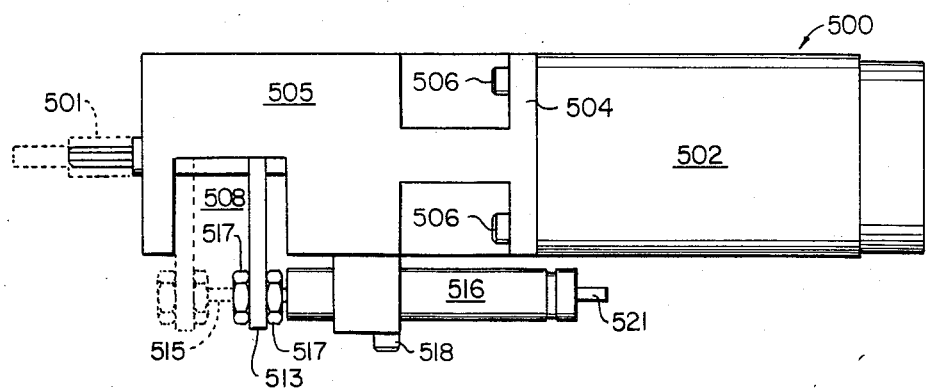
FIG. 4 is a side elevational view of the structure of FIGS. 2 and 3 illustrating in phantom the reciprocating spindle and its operating mechanism in the cassette engaging position.
Figure 3:
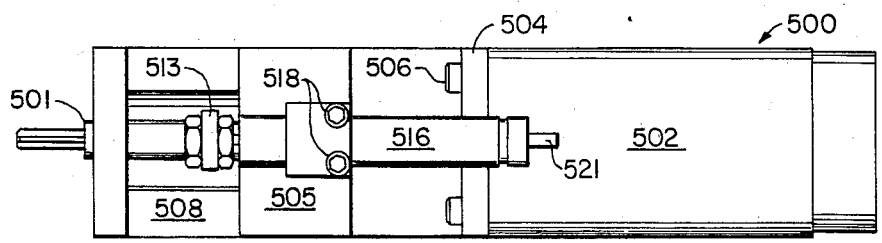
FIG. 3 is a bottom view of the same takeup spindle and drive motor assembly.
Figure 2:
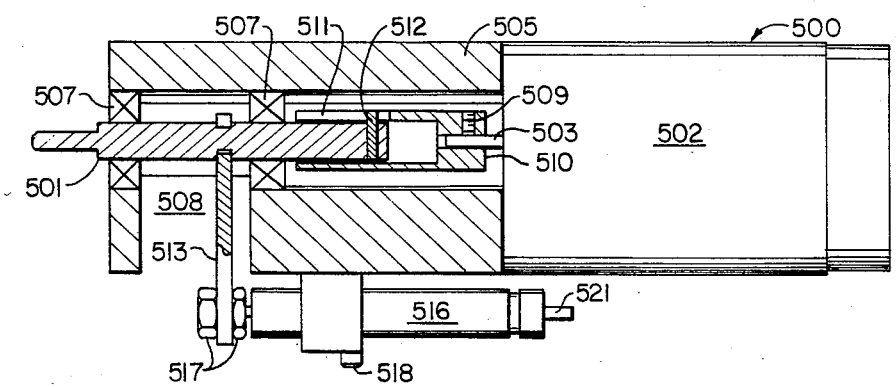
FIG. 2 is a side elevational view, partly in section, of a takeup spindle and drive motor assembly embodying the present invention.
Figure 5:
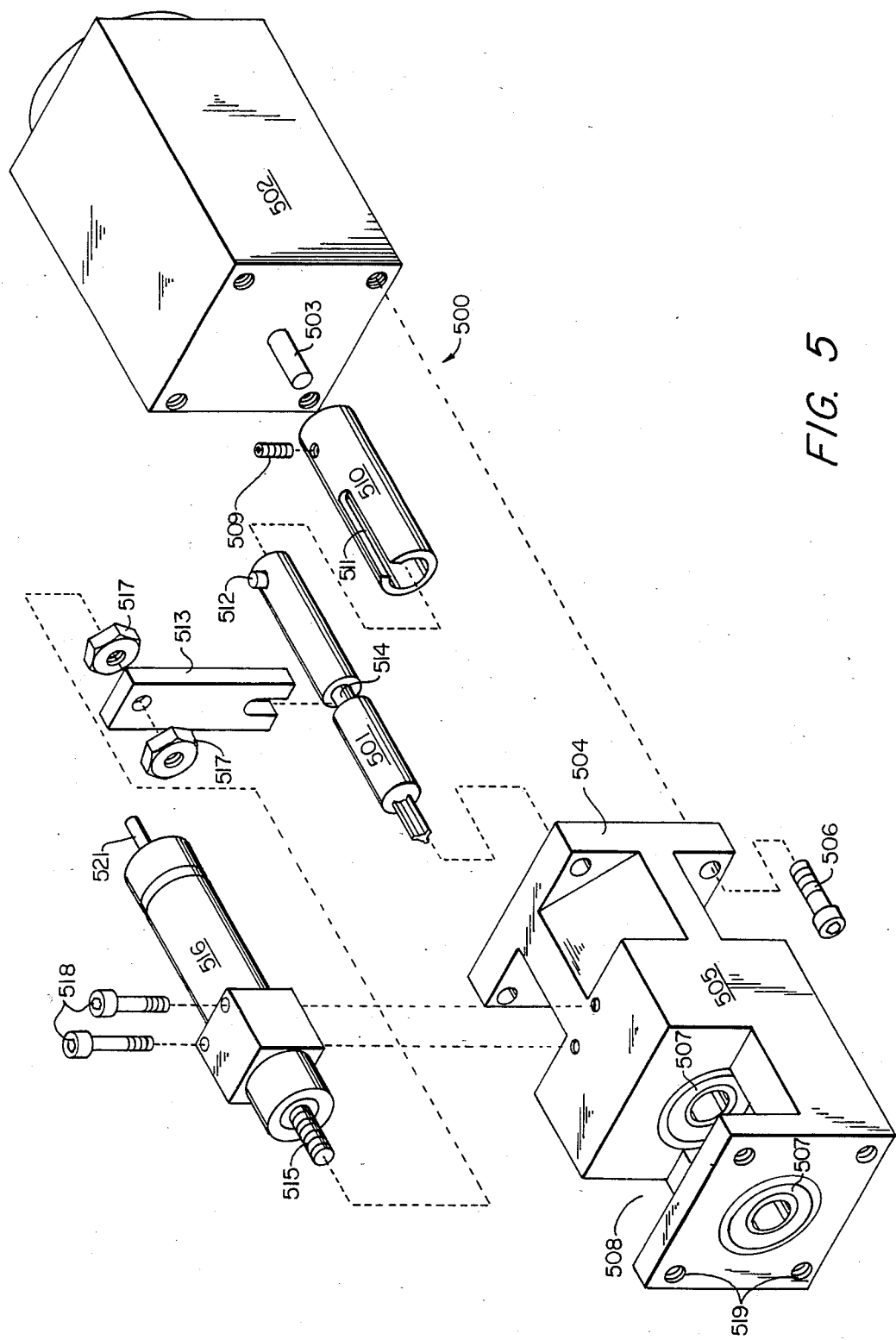
FIG. 5 is an exploded isometric view of the elements forming the takeup mechanism of FIGS. 2 and 3.

Referring to FIGS. 2-5, there is shown a D.C. servomotor 502 (for example, a PANOLY model OMS-512 by Olympus Seiki Co. Ltd.) which is capable of high speed operation of its output shaft 503 (FIGS. 2 and 5). The motor 502 is secured to a flange portion 504 of a spindle and motor support housing 505 by conventional means such as machine screws 506. The support housing 505 has a bore therethrough coincident with the axial extension of output shaft 503 and has a pair of roller or ball bearings 507 press fitted therein, as shown most clearly in FIGS. 2 and 5. A cutout portion at 508 is provided to allow for reciprocation movement of a yoke, to be later described. Secured to motor shaft 503, for example by means of a set screw 509, is a hollow sleeve motor shaft extension 510 which rotates and supports for reciprocation a takeup spindle 501. The end of the takeup spindle or output shaft, which is adapted to engage a conventional, internally toothed hub or spool of a cassette, is configured as is well known in the art and discussed relative to spindle 192 of referenced U.S. Pat. No. 3,997,123. As shown best in FIGS. 2 and 5, the hollow sleeve 510 has a slot 511 at its end remote from the electric motor 502 sized to slidably accept a pin 512 which projects radially from one end of takeup spindle 501. Pin 512 cooperates with slot 511 to slidably key spindle 501 to hollow sleeve 510. Thus, the electric motor 502, through the attachment of hollow sleeve 510 to motor shaft 503 and the keying action of slot 511 and pin 512, imparts its rotary motion to takeup spindle 501.

Axial reciprocation of takeup spindle 501 is effected by means of a yoke 513 which comprises a solid elongated member bifurcated at one end to engage a groove at 514 in takeup spindle 501. The other end of yoke 513 has a hole therethrough sized to receive a piston rod 515 which constitutes the operative member of a conventional pneumatic actuator 516 and is capable of extension and retraction as the actuator is operated. As shown by way of example, piston rod 515 is threaded such that a pair of nuts 517 may be applied to lock the member to yoke 513 in an appropriate position for reciprocation of the takeup spindle 501. Pneumatic actuator 516 is mounted by means of machine screws 518 to support housing 505. Actuator 516 may be of the single or double acting type. As shown in FIGS. 2-5, actuator 516 is of the single-acting type, having a single inlet port 521 at one end for introduction of air. Obviously, actuator 516 may be replaced by a double-acting pneumatic actuator.

The takeup mechanism shown in FIGS. 2-5 is mounted behind front panel 4 of the machine by attaching support housing 505 to plate 6 so that takeup spindle 501 is aligned with hole 499 in plate 6. The mounting of the winding or takeup mechanism 500 may be of any conventional form, such as by tapped holes 519 in the end surface of housing 505 (FIG. 5) for receipt of machine screws (not shown) that extend through plate 6 of FIG. 1. Preferably the mounting arrangement is such as to provide for positioning of the operative end of spindle 501 substantially flush with the front surface of plate 6 when piston rod 514 is in its retracted position, so as to minimize the yoke travel required to cause engagement of spindle 501 with the hub or spool of cassette 38. FIG. 4, illustrates with solid lines the locations of the operative element 515 of pneumatic actuator 516 with yoke 513 and spindle 501 in their retracted position, which will not allow for engagement of the takeup spindle with a cassette 38. The phantom lines portray the locations of piston rod 515, yoke 513 and takeup spindle 501 in their extended positions, in which extended positions the spindle is in engagement with a hub or spool of a cassette 38 in loading position.

Operation of the winding or takeup mechanism 500 in conjunction with the device forming the automatic cassette loading of machine is easily effected since the actuator 516 replaces actuator 204 of U.S. Pat. No. 3,997,123, and the pneumatic and electric timing and switching connections for effecting operation of actuator 516 and servomotor 502 are easily within the skills of ordinary electrical and mechanical technicians involved in the manufacture of cassette loading machines. In this connection, it is to be noted that the takeup mechanisms of this invention does not require a braking mechanism as does the air turbine or takeup drive described in U.S. Pat. No. 3,997,123.

The invention described above offers the advantage that reciprocal axial movement of the takeup spindle can be accomplished at a high speed due to the relatively low inertia of the spindle. This is in contrast to the high inertia arrangement of U.S. Pat. No. 3,997,123 where the entire turbine or electrical motor drive for the takeup spindle is required to be reciprocated for moving the spindle into and out of driving engagement with a hub of a cassette in loading position. Less power also is required to reciprocate only the takeup spindle. A further advantage is that reciprocation of the takeup spindle is accomplished without subjecting the motor to mechanical shock of the magnitude which occurs when the entire takeup mechanism is reciprocated. Therefore, it is believed then that this invention provides a novel tape winding arrangement which, when combined with other devices forming the combination of U.S. Pat. No. 3,957,123, provides an automatic cassette loading machine which is longer lasting and hence more economical than others heretofore known.

Although the invention has been described with reference to a particular embodiment, it should be understood by those skilled in the art that it is capable of a variety of alternative embodiments. For example, the winding mechanism reciprocal operation could be effected by using a solenoid in place of pneumatic actuator 515. Also the sleeve 510 and spindle 501 could be modified by replacing slot 511 and pin 512 with a telescoping axial connection between the sleeve and spindle that is characterized by one or more axial ribs on one member slidably disposed in one or more axial grooves in the other member. Servomotor 502 may be replaced by a d.c. motor, an a.c. motor or an air turbine. Additionally, improvements in the various other devices of the automatic cassette loading machine may be effected without derogating from the effectiveness of this invention.

What is claimed is:

1. In a machine for automatically loading tape into empty cassettes, each of which has two spools with a leader therebetween, said machine including a magazine for storing a supply of empty cassettes, means for holding an empty cassette in a selected loading position, means for withdrawing a leader from an empty casette at said loading position and positioning the withdrawn leader on a splicing block assembly, and means for sequentially (a) severing the leader into two sections, (b) splicing one leader section to the leading end of a supply tape, (c) winding a selected length of said supply tape into said cassette, (d) severing the supply tape, (e) splicing the trailing end of the supply tape to the other leader section, and (f) winding the trailing end of the severed length of supply tape and the other leader section into the cassette;

an improved tape winding mechanism comprising:
an electric motor having a rotatable output shaft;
stationary support means for fixedly supporting said electric motor;
a hollow sleeve having a first end and a second end, said second end being coupled to said output shaft for rotation therewith, said hollow sleeve having an axially extending slot;
a takeup spindle having one end configured to drivably engage a spool of a cassette and a second end slidably disposed within said sleeve, said spindle having a pin that extends into and is slidable along the length of said slot, said pin and slot cooperating so as to lock said spindle and sleeve against rotation relative to one another while permitting said spindle to move axially relative to said sleeve;
coupling means for transmitting rotation of said output shaft to said sleeve;
reciprocator means coupled to said takeup spindle for axially reciprocating said spindle into and out engagement with a spool of a cassette in said selected loading position; and
bearing means for directly supporting said takeup spindle so as to permit said spindle to rotate freely while preventing said spindle from shifting transversely of its rotational axis.

2. A machine as defined in claim 1 wherein said takeup spindle and sleeve are axially aligned with said output shaft.

3. A machine as defined in claim 2 wherein said stationary support means provides a fixed support for said reciprocator means and a fixed support for said bearing means.

4. A machine as defined in claim 3 wherein said reciprocator means for reciprocating said spindle comprises a yoke operatively engaged with said spindle between said one end of said spindle and said first end of said hollow sleeve for transmitting an axial reciprocating motion to said spindle without interfering with its rotational motion.

5. A machine as defined in claim 4 including actuator means fixedly mounted with respect to said stationary support means and having an operative element secured to said yoke for reciprocation thereof such that (a) movement of said yoke by said operative element in one direction causes said one end of said spindle to move to a first position in which it will it engage a spool of a cassette in said loading position, and (b) movement of said yoke by said operative element in an opposite direction causes said one end of said spindle to move to a second position in which it is disengaged from said spool.

6. A machine as defined in claim 5 wherein said actuator means is pneumatically operated.

7. A machine as defined in claim 6 wherein said motor is a D.C. servomotor.

8. In a machine for automatically loading tape into empty cassettes each of which has two spools with a leader therebetween, said machine including a magazine for storing a supply of empty cassettes, means for receiving an empty cassette from said machine and holding said empty cassette in a selected loading position, means for withdrawing a leader from said empty cassette at said selected loading position and positioning the withdrawn leader on a splicing block assembly, and means for sequentially (a) severing the leader into two sections, (b) splicing one leader section to the leading end of a supply tape, (c) winding a selected length of said supply tape into said cassette, (d) severing the supply tape, (e) splicing the trailing end of the supply tape to the other leader section and (f) winding the trailing end of the severed length of supply tape and the other leader section into said cassette, an improved tape winding mechanism comprising:
- a stationary support means secured to a part of said machine;
- an electric motor with a rotatable output shaft;
- means securing said motor to said stationary support means;
- a takeup spindle having one end configured to drivably engage a spool of a cassette;
- means providing a telescoping connection between said output shaft and said spindle arranged so as to transmit rotation of said output shaft to said spindle while allowing reciprocating axial motion of said spindle relative to said output shaft;
- bearing means for directly supporting said spindle so as to permit it to rotate freely while preventing said spindle from shifting transversely of its rotational axis; and
- selectively operable means for causing said spindle to move axially in a first direction or a second opposite direction without interfering with rotation of said spindle.

9. A machine as defined in claim 8 wherein said stationary support means comprises a rigid member secured to said machine, and further wherein said bearing means and said selectively operable means are attached to said rigid member.

10. A machine as defined in claim 9 having:
- a yoke operatively engaged with said spindle for transmitting an axial reciprocating motion to said spindle without interfering with its rotation motion; and
- pneumatic actuator means fixedly mounted to said rigid member and having an operative reciprocatable element secured to said yoke for selectively causing reciprocal movement of said yoke in synchronism with said operative element.

11. A machine as defined in claim 10 wherein said means providing a telescoping connection comprises a hollow sleeve mounted to said output shaft and having an axially oriented slot therein which mates with a pin on said spindle for effecting rotation of the spindle by said output shaft.

12. A machine as defined in claim 11 wherein said yoke is bifurcated at one end to mate with a circumferential groove in said spindle.

13. A machine as defined in claim 11 wherein said pneumatic means comprises a cylinder and said operative element comprises a piston rod.

14. A winding mechanism for an automatic cassette tape loading machine, said mechanism comprising:
- a rigid motor support member secured to said machine;
- an electric motor with a rotatable shaft;
- a takeup spindle axially aligned with said shaft and having one end configured to drivably engage a cassette;
- means securing said motor to said support member;
- bearing means carried by said rigid support member and engaged with said takeup spindle, said bearing means supporting said spindle so as to permit said spindle to rotate freely while preventing said spindle from shifting transversely of its rotational axis;
- coupling means connecting said output shaft to said spindle so as to cause said spindle to be driven by said output shaft while allowing reciprocating axial motion of said spindle, said coupling means including an elongated coupling member coaxial with said spindle and mounted for rotation on its longitudinal axis, means providing a driven connection between said coupling member and said output shaft, and means providing a telescoping connection between said coupling member and said spindle arranged so as to cause said spindle to be driven by said coupling member while allowing said spindle to reciprocate axially; and
- selectively operable actuator means secured to said motor support member for axially reciprocating said spindle without interfering with its rotation.

15. A winding mechanism as defined in claim 14 wherein said motor is a servomotor.

16. A winding mechanism as defined in claim 15 wherein said said selectively operable actuator means is a pneumatic actuator having a piston rod coupled to said spindle by a yoke that embraces said spindle and coacts therewith so as to effect reciprocation of said spindle in said hollow sleeve in response to reciprocation of said piston rod.

* * * * *